United States Patent
Freivald et al.

(10) Patent No.: US 6,219,818 B1
(45) Date of Patent: *Apr. 17, 2001

(54) CHECKSUM-COMPARING CHANGE-DETECTION TOOL INDICATING DEGREE AND LOCATION OF CHANGE OF INTERNET DOCUMENTS

(75) Inventors: Matthew P. Freivald, Sunnyvale; Mark S. Richards, San Jose; Alan C. Noble, Santa Cruz, all of CA (US)

(73) Assignee: NetMind Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/252,175

(22) Filed: Feb. 18, 1999

Related U.S. Application Data

(63) Continuation of application No. 08/783,625, filed on Jan. 14, 1997, now Pat. No. 5,898,836.

(51) Int. Cl.[7] .................................................. H04L 12/00
(52) U.S. Cl. ........................ 714/799; 709/203; 709/219; 709/224; 709/245; 709/246; 709/218; 707/1; 707/10; 707/201; 707/513; 714/48; 714/57
(58) Field of Search .................................. 707/1, 10, 201, 707/104, 513; 709/218, 203, 219, 224, 245, 246; 714/48, 57, 799

(56) References Cited

U.S. PATENT DOCUMENTS

| | | | |
|---|---|---|---|
| 4,991,087 | 2/1991 | Burkowski et al. | 364/200 |
| 5,319,779 | 6/1994 | Chang et al. | 395/600 |
| 5,347,652 | 9/1994 | Epstein et al. | 395/600 |
| 5,355,472 | 10/1994 | Lewis | 395/600 |
| 5,388,255 | 2/1995 | Pytilk et al. | 395/600 |
| 5,408,655 | 4/1995 | Oren et al. | 395/600 |
| 5,446,891 | 8/1995 | Kaplan et al. | 395/600 |
| 5,479,654 | 12/1995 | Squibb | 395/600 |

(List continued on next page.)

OTHER PUBLICATIONS

URL–Minder FAQ, NetMind Services, Inc. Dec. 1996.
"Assembling the Ultimate Browser—Notifiers", Matt Lake, CNET Reviews, Dec. 18, 1996.

Primary Examiner—Meng-Al T. An
Assistant Examiner—Wen Tai Lin
(74) Attorney, Agent, or Firm—Stuart T. Auvinen

(57) ABSTRACT

A change-detection web server automatically checks web-page documents for recent changes. The server retrieves and compares documents one or more times a week. The user is notified by electronic mail when a change is detected. The user registers a web-page document by submitting his e-mail address and the uniform resource locator (URL) of the desired document. The document is fetched and the user can select text on the page of interest. Non-selected text is ignored; only changes in the selected text are reported back to the user. Thus changes to less relevant parts of the document are ignored. The document is divided into sections bounded by hyper-text markup-language (HTML) tags. A checksum is generated and stored for each HTML-bound section. Storage requirements are reduced since only checksums are stored rather than the original documents. During periodic comparisons a fresh copy of the document is retrieved, divided into HTML-bound sections and checksums generated for each section. The freshly-generated checksums are compared to the archived checksums. Sections with non-matching checksums are highlighted as changed, and the percentage of changed sections is reported. The user-defined selection is also stored as a checksum and compared to a freshly-generated checksum. Changed checksums outside the user-defined selection do not generate a change notification. Re-ordering of sections does not generate a change notification when the checksums otherwise match. Thus format and layout changes do not generate change notifications, and the frequency of notices to user is reduced.

17 Claims, 10 Drawing Sheets

U.S. PATENT DOCUMENTS

| | | | |
|---|---|---|---|
| 5,483,651 | 1/1996 | Adams et al. | 395/600 |
| 5,530,794 | 6/1996 | Luebbert | 395/148 |
| 5,535,335 | 7/1996 | Cox et al. | 395/200.11 |
| 5,535,382 | 7/1996 | Ogawa | 395/600 |
| 5,537,132 | 7/1996 | Teraoka et al. | 345/133 |
| 5,542,090 | 7/1996 | Henderson et al. | 395/600 |
| 5,544,049 | 8/1996 | Henderson et al. | 364/419.19 |
| 5,813,007 | 9/1998 | Nielson | 707/10 |

USER SETUP    FIG. 2

WEEKLY COMPARE   FIG. 3

REPORT CHANGE    FIG. 4

RESPONDER

```
<TAG1>
TEXT IN SECTION 1...
</TAG1>
<TAG2>
TEXT IN SECTION 2...
</TAG2>
<TAG3>
TEXT IN SECTION 3...
</TAG3>
<TAG4>
TEXT IN SECTION 4...
</TAG4>
```

| 1 | CRC1 |
|---|------|
| 2 | CRC2 |
| 3 | CRC3 |
| 4 | CRC4 |

```
<TAG1>
TEXT IN SECTION 1...
</TAG1>
<TAG2>
TEXT IN SECTION 2...
MORE TEXT IN SECTION 2...
</TAG2>
<TAG3>
TEXT IN SECTION 3...
MORE TEXT IN SECTION 3...
</TAG3>
```

USER SELECTION { MORE TEXT IN SECTION 2... </TAG2> <TAG3> TEXT IN SECTION 3... }

| SECTION # | CRC | ENA/DIS SECTION |
|---|---|---|
| 1 | CRC1 | 0 |
| 2 | CRC2 | 1 |
| 3 | CRC3 | 1 |
| 4 | CRC4 | 0 |

90

| USER SELECTION # | STARTING SECTION # | LENGTH | CRC |
|---|---|---|---|
| 1 | 2 | LEN1 | CRC1A |

92

US 6,219,818 B1

CHECKSUM-COMPARING CHANGE-DETECTION TOOL INDICATING DEGREE AND LOCATION OF CHANGE OF INTERNET DOCUMENTS

RELATED APPLICATION

This Application is a continuation of Ser. No. 08/783,625 filed Jan. 14, 1997, now U.S. Pat. No. 5,898,836, hereby incorporated by reference.

BACKGROUND OF THE INVENTION

1. Field of the Invention

This invention relates to software retrieval tools for networks, and more particularly for a change-detection and highlighting tool for the Internet.

2. Description of the Related Art

Today's society is sometimes referred to as an information society. Technology has increased the ease of generating and disseminating information. The widespread acceptance of the global network known as the Internet allows huge amounts of information to be instantly transmitted to persons around the world.

Explosive growth is occurring in the part of the Internet known as the World-Wide Web, or simply the "web". The web is a collection of millions of files or "web pages" of text, graphics, and other media which are connected by hyper-links to other web pages. These may physically reside on a computer system anywhere on the Internet—on a computer in the next room or on the other side of the world.

These hyper-links often appear in the browser as a graphical icon or as colored, underlined text. A hyper-link contains a link to another web page. Using a mouse to click on the hyper-link initiates a process which locates and retrieves the linked web page, regardless of the physical location of that page. Hovering a mouse over a hyper-link or clicking on the link often displays in a corner of the browser a locator for the linked web page. This locator is known as a Universal Resource Locator, or URL.

The vast amount of information available on the Internet has created an overload of information which the casual user cannot digest. Internet search tools or search engines allow users to find desired information by searching for keywords through an index of the millions of documents posted on the Internet. Search engines such as Excite of Mountain View, Calif. and Digital Equipment's "ALTA VISTA" help users quickly sift through huge amounts of information to find the desired information.

A characteristic of the Internet is that it is relatively easy to change or update information. The user may wish to know when updates are made to the desired information he found with a search. For example, the information found may describe a bug fix or other revision in a software program. Initially a crude work-around or even just a notice of the bug may be posted on the Internet. Later, this posting may be updated with a more robust fix or other useful information. The information could also be a list of phone numbers or other contact information, or it could be a product list or a competitor's web site, advertising, or press releases.

The user could frequently re-access the information on the Internet to see if changes have occurred, but this is time-consuming. Frequently re-accessing the information is tedious, particularly when the information is contained in a long document, or when many documents must be checked for changes.

Software tools have been developed to automate the task of detecting updates to information on the Internet. Early tools such as America Online's News Profiles allow users to specify keywords which are periodically searched for in a news database. News articles containing the specified keywords are sent to the user by electronic mail (e-mail).

These automated software tools are sometimes known as "netbots", a network robot which automatically performs some task for a user. Netbots allow users to better manage the information on the Internet and reduce the amount of information that a user must read. Filtering down the amount of information is critical to making good use of the overwhelming amount of information available on the Internet.

More recent change-detection tools allow users to register a document or web page on the Internet and be notified when any change to that document occurs. The user "registers" a document by specifying the URL of the document, and providing the user's e-mail address. The change-detection tool stores a local copy of the document together with the user's e-mail address. Once every day or week the change-detection tool accesses the source document at the specified URL, and compares the retrieved source document to the local copy of the document. If a difference between the older local copy and the just-retrieved source document is detected, then a message is sent to the user's e-mail address, perhaps with a copy of the new document or a copy of the changes.

The document-change tool could store an actual copy of the entire document at the tool's web site for comparison. However, storing the whole document at the document-change-tool's web site is expensive because large amounts of storage are needed. For example, if 500,000 documents were registered, and each document averages 50 Kbytes, then 25 GigaBytes of storage are needed to store copies of the registered documents.

Instead of storing the entire document, the revision date or time-stamp of the document could be stored. U.S. Pat. No. 5,388,255 shows a database which compares time stamps to determine when data has changed. Since the time-stamp is much smaller than the entire document, storage space is reduced at the tool's web site.

The inventors have a change-detection tool which stores a checksum or CRC of the document rather than the time-stamp or the entire document. When the document is initially registered, a checksum is generated for the entire source document. This checksum is stored at the tool's web site. Each week when the source document is retrieved, another checksum is generated and compared to the stored checksum. If the stored checksum matches the newly-generated checksum, then no change is detected. When the checksums do not match, then the user is notified of a change by e-mail. The user can optionally have a copy of the new document attached to the e-mail notification.

Such a change-detection tool called a "URL-minder" has been available for free public use at the inventor's web site, www.netmind.com, for more than a year before the filing date of the present application. Over 150,000 documents or URL's are registered at that site for 1.4 million users.

Minor Changes not Filtered Out

While such a change-detection tool is useful, the existing tool has several drawbacks. Since minor changes are frequently made to Internet documents, users are notified of many insignificant changes. The users can quickly become irritated with frequent e-mail notices of the minor, irrelevant changes. Statistics taken for the URL-minder tool in May, 1996, showed that over 100,000 change notices were e-mailed in just four days to the 500,000 registered users.

Internet documents change every few weeks on the average. Thus a user with a few dozen registered documents receives notices almost every day. This is an undesirably high frequency of notices for many users.

Location of Change Desirable

When the entire document is stored rather than a checksum, the location of the change in the document can be found and highlighted to the user since the original document is available for comparison. However, when a single checksum is stored for each registered document, the changes within that document cannot be determined or identified. Thus the user is left to determine the location of the change within the document, and the relevance of that change.

With the existing URL-minder which stores only checksums, when a change is detected, the user is simply notified that there was a change. The user can optionally receive a copy of the changed document, but the changes are not highlighted. Thus the user must re-read the entire document to determine what the change was. Often the changes are minor and even hard to detect, such as a spelling change of a word, or a date change. Sometimes the order or arrangement of text has changed but not the content. These minor changes are not always significant to the user.

Thus the user is plagued with frequent notices of minor changes, and the user must re-read the entire document to determine what the change was. Having to re-read the documents increases the burden on the user, which is the opposite intent of an automated tool or netbot.

Long, Complex Documents Common

The change-detection tool allows a user to register a document by specifying the uniform-resource-locator (URL) of that document. A unique URL is specified for each web page on the Internet's world-wide-web. Other information sometimes embedded in the URL includes passwords or search text that the user types in, or name and address information typed in. Internet documents are usually web pages containing several individual files such as for graphics, text, and motion video and sound. Sometimes these files include small programs such as CGI (common gateway interface) scripts. Thus the documents registered are fairly complex and often lengthy.

Often the user is only interested in a small part of a document, rather than the whole document. A user might be interested only in one contact or phone number on a list of hundreds of phone numbers for an office, or only one product line in a long list of products. It is desirable to allow the user to specify only the portion of a document or web page which is of interest.

What is desired is a storage-efficient change-detection tool which detects when changes occur to a registered document on the Internet. It is desired that minor changes to the document be filtered by the change-detection tool to reduce the number of change notifications sent to the user. It is also desired to give the user an indication of how significant the change is. It is desired to allow the user to identify relevant portions of a document so that the user is not notified of changes to other portions of the document. It is further desired to reduce storage requirements for the change-detection tool by storing a condensed checksum or signature of the registered document rather than storing the entire document.

SUMMARY OF THE INVENTION

A change-detection web server has a network connection for transmitting and receiving packets from a remote client and a remote document server. A responder is coupled to the network connection. The responder communicates with the remote client to register a document for change detection by receiving from the remote client a uniform-resource-locator (URL) identifying the document. The responder fetches the document from the remote document server and generates an original checksum for a checked portion of the document. The checked portion is less than the entire document.

A database is coupled to the responder. It receives the URL and the original checksum from the responder when the document is registered by the remote client. The database stores a plurality of records each containing a URL and a checksum for a registered document. A periodic minder is coupled to the database and the network connection. It periodically re-fetches the document from the remote document server by transmitting the URL from the database to the network connection. The periodic minder receives a fresh copy of the document from the remote document server. The periodic minder generates a fresh checksum of a portion of the fresh copy of the document and compares the fresh checksum to the original checksum. A detected change is signaled to the remote client when the fresh checksum does not match the original checksum.

Thus a change in the document is detected by comparing a checksum for the checked portion of the document. Changes in portions of the document outside the checked portion are not signaled to the remote client.

In further aspects the database does not store the document. The database stores a checksum for the document. Thus storage requirements for the database are reduced by archiving checksums and not entire documents.

In other aspects of the invention a selection means is coupled to the responder. It receives a selection from the remote client. The selection identifies boundaries of the checked portion of the document. A parsing means is coupled to the periodic minder. It parses the fresh copy and generates checksums for a plurality of portions of the fresh copy. A compare means is coupled to the parsing means. It signals a match when any of the checksums generated by the parsing means matches the original checksum from the database. Thus a change in the document is detected when the match is not signaled by the compare means. The parsing means generates a plurality of checksums for the plurality of portions of the fresh copy.

In still further aspects of the invention a length field indicates a size of the checked portion. The length field is written by the selection means. The parsing means generates each checksum for portions having the size of the checked portion. Thus the size of the checked portion is stored and used by the parsing means.

In further aspects the document is a hyper-text markup-language (HTML) document containing HTML tags. The HTML tags indicate formatting, layout, and hyper-links specifying URLs of other servers. The change-detection web server also has divider means coupled to the responder, for dividing the document into portions bound by the HTML tags. A checksum means generates original checksums. An original checksum is generated for each portion bound by HTML tags. The database stores the original checksums for the portions bound by the HTML tags. The periodic minder also has a second divider means which divides the fresh copy of the document into portions bound by the HTML tags. A second checksum means generates fresh checksums for portions of the fresh copy bound by HTML tags in the fresh copy of the document. A compare means receives the fresh checksums of the fresh copy from the second checksum means. It compares the fresh checksums to the original checksums from the database. A report means signals a change in the document when an original checksum for the document has no matching fresh checksum. Thus checksums are generated and stored for portions of the document bound by the HTML tags.

In further aspects the report means has a mailer means coupled to the network connection. It sends a change notification message to the remote client when the change is signaled. The responder receives an electronic-mail address from the remote client and stores the electronic-mail address of the remote client in the database. The mailer means reads the electronic-mail address from the database. The change notification message is sent to the remote client as an electronic-mail message addressed to the electronic-mail address. Thus the remote client is notified of the change by electronic mail.

BRIEF DESCRIPTION OF THE DRAWINGS

FIG. 7 is a diagram of an HTML document and a table of checksums for the HTML-delineated sections.

FIG. 10 is a diagram illustrating an alternate embodiment which archives separate checksums for HTML-defined sections and checksums for user-defined sections.

DETAILED DESCRIPTION

The present invention relates to an improvement in Internet-document change-detection tools. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Overview of Change-detection Web Server

Figure 1:
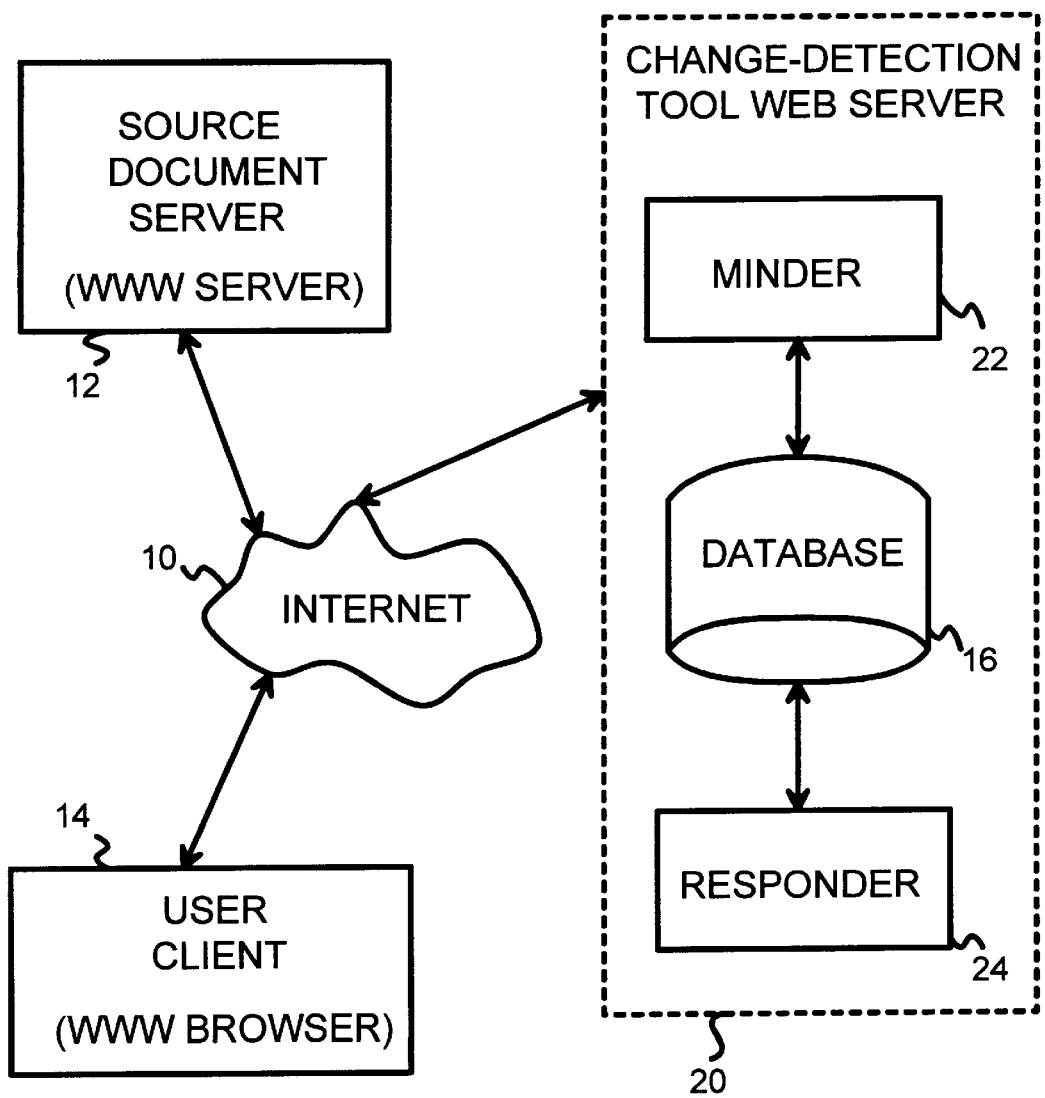
FIG. 1 is a diagram of a change detection tool on a server on the Internet.

FIG. 1 is a diagram of a change detection tool on a server on the Internet. The user operates client 14 from a remote site on Internet 10. The user typically is operating a browser application, such as Netscape's Navigator or Microsoft's Internet Explorer. Client 14 communicates through Internet 10 by sending and receiving TCP/IP packets to establish connections with remote servers, typically using the hyper-text transfer protocol (http) of the world-wide web.

Client 14 retrieves web pages of files from document server 12 through Internet 10. These web pages are identified by a unique URL (uniform resource locator) which specifies a document file containing the text and graphics of a desired web page. Often additional files are retrieved when a document is retrieved. The "document" returned from document server 12 to client 14 is thus a composite document composed of several files of text, graphics, and perhaps sound or animation. The physical appearance of the web page on the user's browser on client 14 is specified by layout information embedded in non-displayed tags, as is well-known for HTML (hyper-text markup language) documents. Often these HTML documents contain tags with URL's that specify other web pages, perhaps on other web servers which may be physically located in different cities or countries. These tags create hyper-links to these other web servers allowing the user to quickly jump to other servers. These hyper-links form a complex web of linked servers across the world; hence the name "world-wide web".

The user may frequently retrieve files from remote document server 12. Often the same file is retrieved. The user may only be interested in differences in the file, or learning when the file is updated, such as when a new product or service is announced. The inventors have developed a software tool which automatically retrieves files and compares the retrieved files to an archived checksum of the file to determine if a change in the file has occurred. When a change is detected, the user is notified by an electronic mail message (e-mail). A copy of the new file may be attached to the e-mail notification, allowing the user to review the changes.

Rather than archive the source files from remote document server 12, the invention archives a checksum of CRC of the source files. These CRC's and the e-mail address of the user are stored in database 16 of change-detection server 20. Comparison is made of the stored or archived CRC of the document and a fresh CRC of the currently-available document. The CRC is a condensed signature or fingerprint of the document. Any change to the document changes the CRC. Aliasing of CRC's can be reduced to a very small probability by using sufficiently large CRC's, such as an 8-byte CRC. With an 8-byte CRC it is extremely improbable that a change to a document results in the same CRC being generated. If an identical CRC is generated, then the user is not notified of any change.

Change-detection server 20 performs three basic functions:

1. Register (setup) a web page document for change detection.
2. Periodically re-fetch the document and compare for changes
3. E-mail a change notice to the registered user if a change is detected.

Change-detection server 20 contains three basic components. Database 16 stores the archive of CRC's for registered web-page documents. The URL identifying the web page and the user's e-mail address are also stored with the archived CRC's. Responder 24 communicates with the user at client 14 to setup or register a web page document for change detection. Minder 22 periodically fetches registered documents from document server 12 through Internet 10. Minder 22 compares the archived CRC's in database 16 to new CRC's of the fetched documents to determine if a change has occurred. When a change is detected, minder 22 sends a notice to the user at client 14 that the document has changed.

Figure 2:
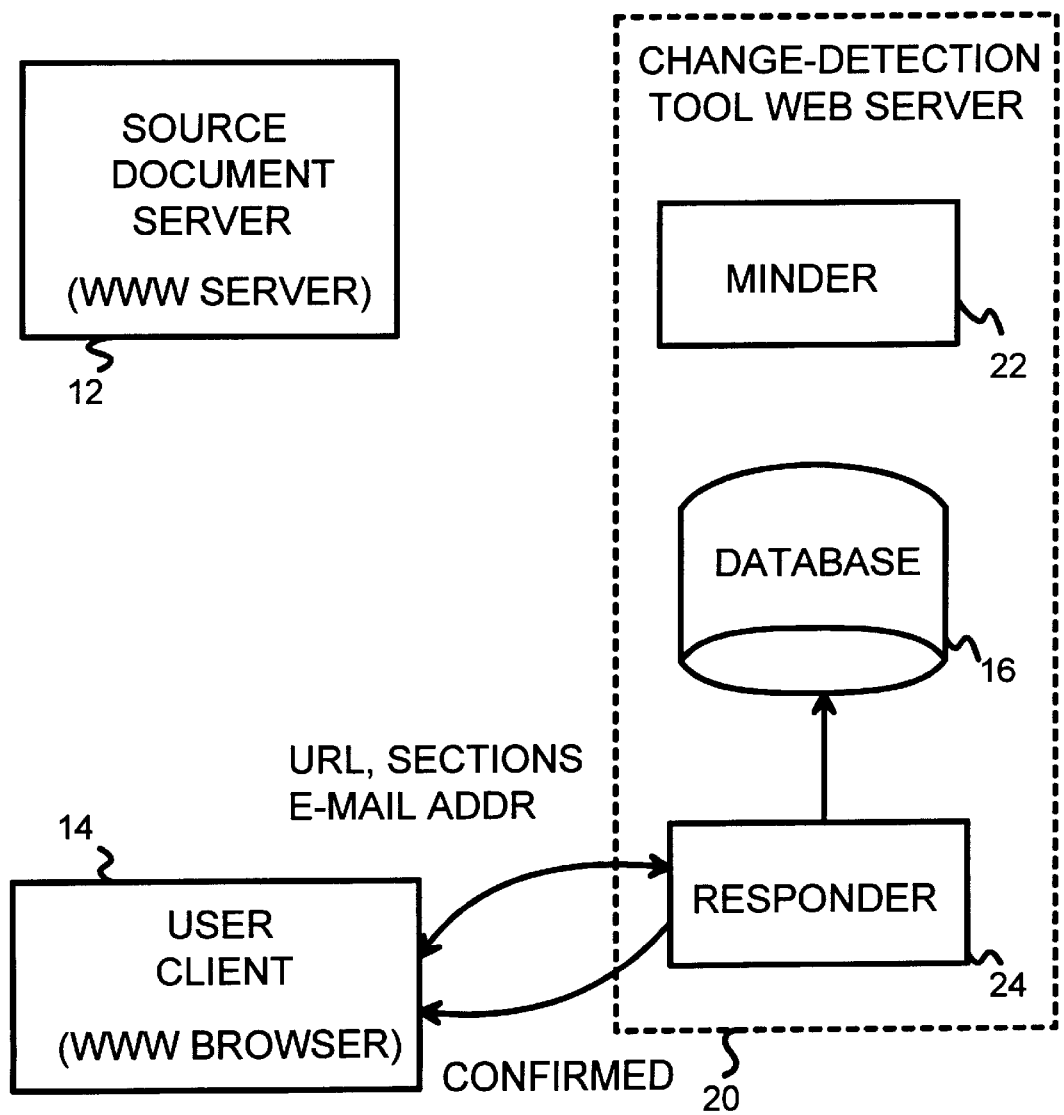
FIG. 2 shows a user registering a web page document for change detection.
Figure 3:
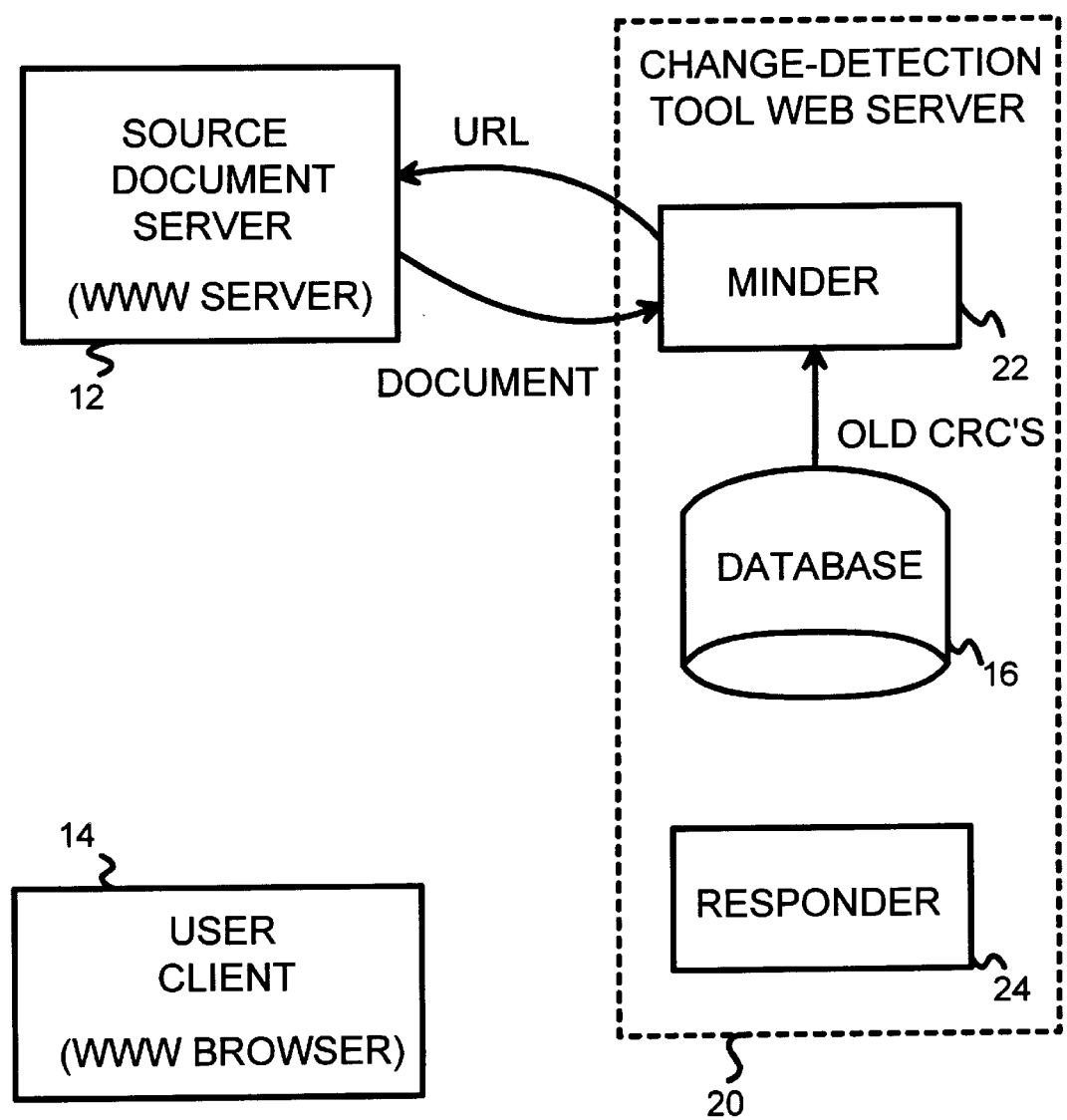
FIG. 3 shows a periodic comparison of a registered web page document to determine if the document has changed.
Figure 4:
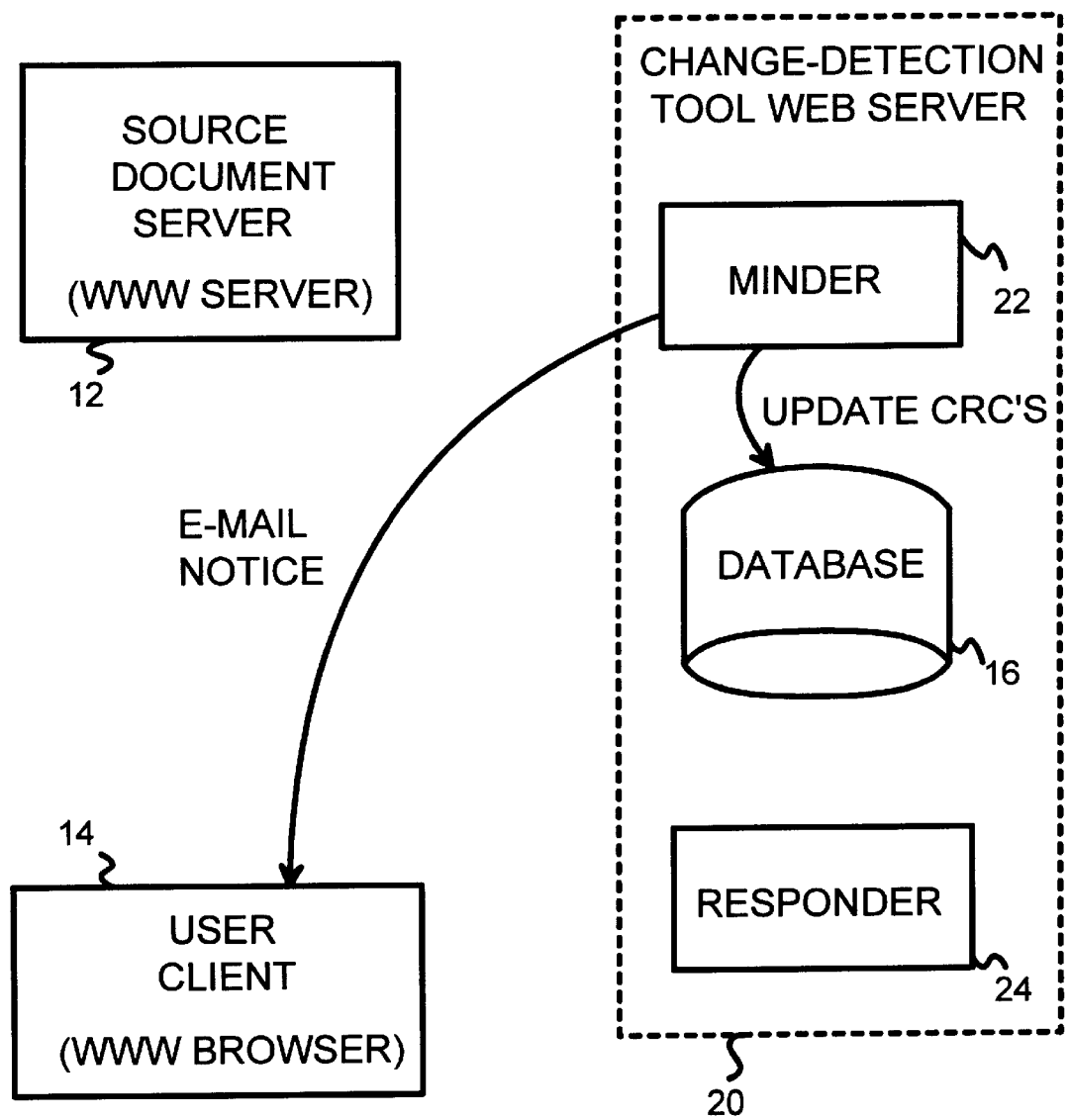
FIG. 4 shows a document-change notice being generated and sent to the user.

Overview of Operation—FIGS. 2, 3, 4

FIG. 2 shows a user registering a web page document for change detection. The user on client 14 registers a web page document by specifying the URL which identifies the web page. A portion of the URL is translated into an IP address of a server by a domain-name server. The user also sends his e-mail address to responder 24. Responder 24 fetches the web page and displays the page to the user. The user then selects which portions of the web page document are to be compared for changes. The user can select paragraphs of text by dragging a highlight across the text. Responder 24 then stores the location of the selected text and generates one or more CRC for the selected text. Responder 24 then stores the CRC(s), URL, and e-mail address in database 16. A confirmation that the web page document has been registered is finally sent to the user on client 14.

FIG. 3 shows a periodic comparison of a registered web page document to determine if the document has changed. Each registered document is compared for changes on a periodic basis which depends on the number of registered documents and the speed of operation of change-detection server 20. Typically each document is compared every few days, although more frequent comparisons are possible.

Minder 22 reads the URL of the registered document from database 16. Minder 22 automatically fetches from document server 12 a fresh copy of the web-page document pointed to by the URL. Client 14 is not involved in this transaction. Occasionally the URL is deleted or does not respond, and a change is then signaled indicating that the URL could not be fetched. Change-detection server 20 may try to fetch the document again after several hours so that temporary shutdowns do not generate spurious change notices.

Once a fresh copy of the registered document has been fetched from the Internet, one or more CRC's of the fresh document are generated. These CRC's are compared to archived CRC's stored in database 16. A mis-compare of one or more CRC's indicates that the document changed.

FIG. 4 shows a document-change notice being generated and sent to the user. When a change has been detected by minder 22, a change notice is sent by e-mail to the registered user at client 14. The user's e-mail address is fetched from database 16 by minder 22. The new CRC's generated from the fresh copy of the registered document are written to database 16 so that future comparisons reflect the recent changes.

When the change that was detected is in a portion of the document not selected by the user when registering the document, a change notice is not sent. Thus changes to non-selected portions of a registered document do not generate change notices. This allows the user to filter out irrelevant changes, such as date changes or access counters which are frequently updated.

Figure 5:
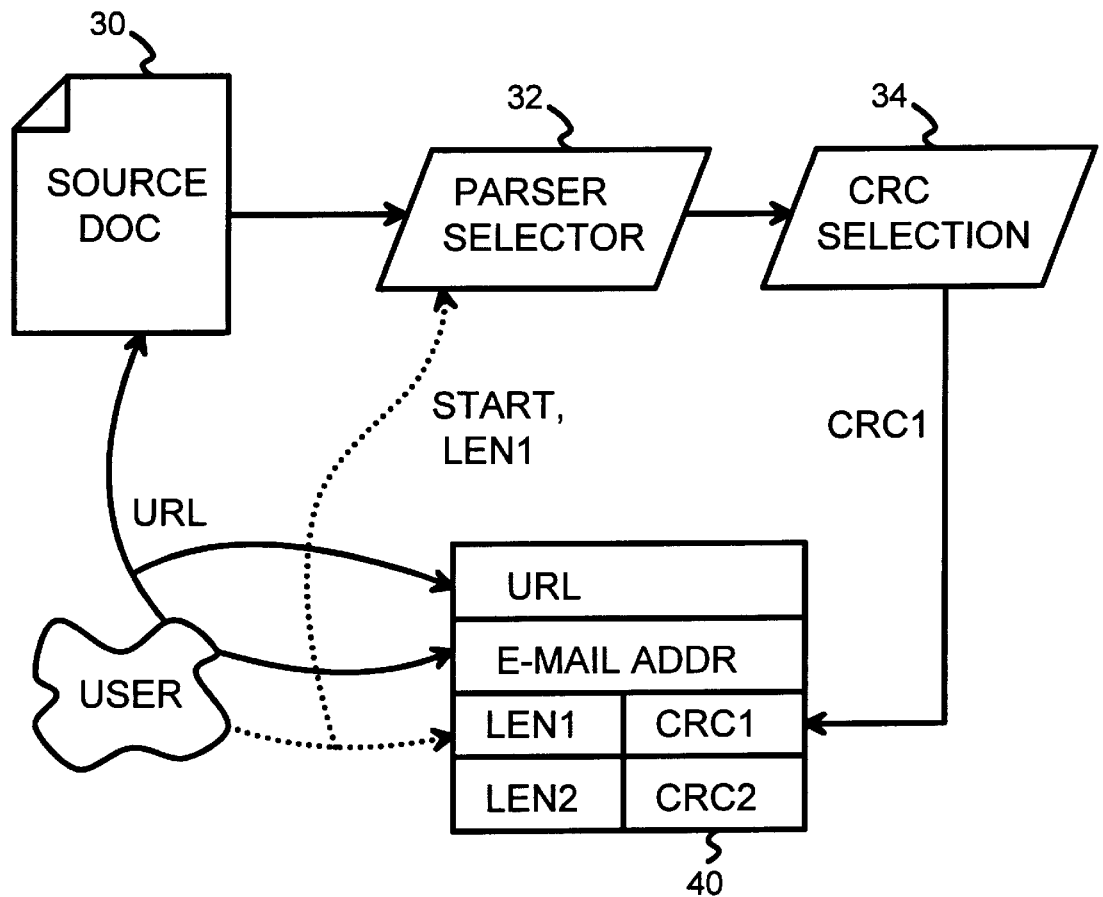
FIG. 5 illustrates the operation of responder 24 of FIG. 1 when the registered document is an arbitrary, unstructured file.
Figure 6:
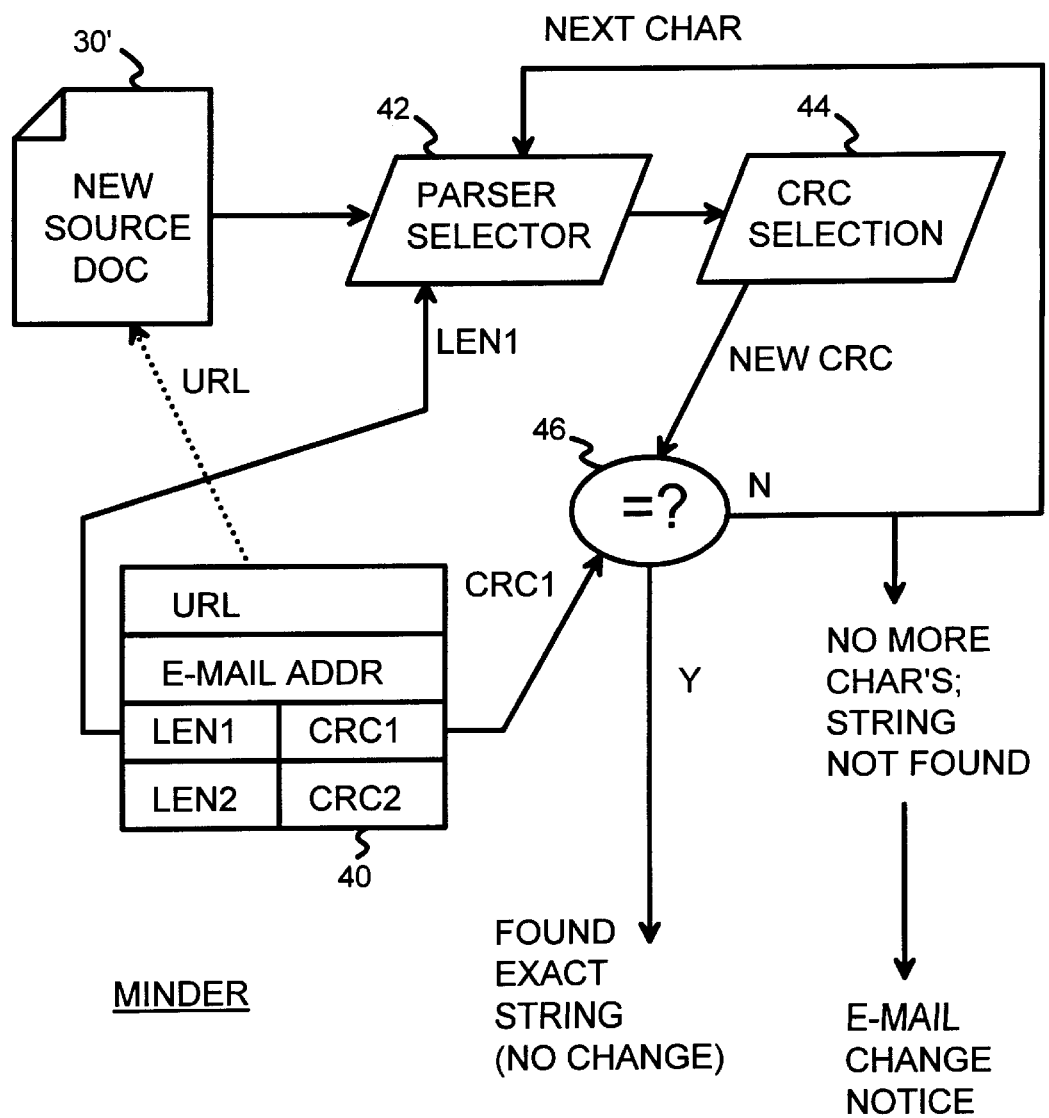
FIG. 6 illustrates operation of minder 22 of FIG. 1 when the registered document has an arbitrary, unstructured format.

Change Detection for Arbitrary Documents—FIGS. 5, 6

Changes can be detected in arbitrary documents which lack any structure. Various graphics image files and sound files may appear as arbitrary files. Most web pages are HTML files and have structure which can be exploited to improve change detection as discussed later. The methods for arbitrary documents can be applied to all non-HTML documents which are registered.

FIG. 5 illustrates the operation of responder 24 of FIG. 1 when the registered document is an arbitrary, unstructured file. The user initiates registration of a document by providing the URL identifying the document and the user's e-mail address. These can be provided by typing or pasting them into fields on a registration web page at change-detection server 20.

Change-detection server 20 uses the URL to fetch a copy of source document 30 from document server 12 of FIG. 1. Source document 30 could be any one of millions of documents on the thousands of web servers connected to the Internet. Source document 30 is displayed to the user, allowing the user to select portions of source document 30 for registration. The user can select portions of source document 30 by dragging a highlight with a mouse over the text to be selected. Alternately, the user can select whole paragraphs by triple-clicking anywhere inside these sections, or a single word or numeric value by double-clicking on the word. Changes which occur in unselected portions of source document 30 do not generate change notifications.

The selection information from the user is encoded as a string of length LEN1, with a starting location START. Parser 32 reads characters from source document 30 one at a time until the first character in the string at the starting location START is found.

START can simply be an offset in bytes or in characters from the beginning of the file to the beginning of the user's selection. Characters following START are sent from parser 32 to CRC generator 34 until the number of characters indicated by LEN1 is reached, indicating that the end of the selection has been reached. CRC generator 34 calculates the cyclic-redundancy-check (CRC) of these characters selected by the user from source document 30. Methods of generating CRC's and other checksums are well-known in the art and any of several methods can be used.

The CRC is typically generated by exclusive-ORing bits from a current character with a running checksum to generate a new checksum, which is then exclusive-ORed with bits from the next character. The final value of the running checksum, CRC1, is written to record 40 in database 16 of FIG. 1. The URL and the e-mail address from the user are also written to record 40. The length of the selection, LEN1, is also written to record 40, but the starting location is not. The starting location can change when changes are made to the web page document in the non-selected region before the selection, such as in a document header. Thus the starting location can change even when the selection has not changed, and changes in the header should be ignored.

The user may make several selections on the same source document 30, and each selection has it length and CRC stored in record 40. For example, the second user-selection stores LEN2 and CRC2 in record 40.

FIG. 6 illustrates operation of minder 22 of FIG. 1 when the registered document has an arbitrary, unstructured format. The minder performs change-detection on each of the thousands of documents having their URL's registered. Checking is preferably performed once for all users registering the same URL since this saves re-fetching documents for different users.

The minder begins by reading record 40 from database 16 of FIG. 1. The URL in record 40 is used to access the remote document server on the Internet and retrieve a fresh document copy 30' of source document 30 which was registered as described for FIG. 5. Fresh document copy 30' is parsed by parser 42 and each successive character of document copy 30' is sent to CRC generator 44 until the stored length LEN1 is reached. A new CRC for this string from document copy 30' is generated by CRC generator 44 and compared to the archived CRC1 in record 40 by comparator 46. If the archived CRC and the newly-generated CRC match, then the string has been found and no change has occurred.

If the CRC's do not match, then another string of length LEN1 starting at the next character in document copy 30' is selected by parser 42 and its CRC generated and compared. This process continues through all possible strings of length LEN1 in document copy 30' until a match has been found, indicating that a string matching the user's selection was found, or until the end of the document copy 30', indicating that the user's selection was not found and therefore a change occurred. A change notice is then sent to the e-mail address stored in record 40.

While it may appear tedious to parse through fresh document copy 30' an generate a CRC for each possible string of length LEN1, this process is quite rapid when executed by a general-purpose computer. The process can be accelerated by storing the first one or two characters in the selection along with the length and CRC in record 40. Parser 42 then parses the file looking for the first character followed by the second character and then generates a CRC only for strings having the correct first and second characters. This increases storage by 2 bytes per record, but reduces the number of strings generating a CRC by about $(1/25)^2$ or a factor of 600.

Change-detection of Portions of Structured HTML Documents

The inventors have realized that most documents of interest on the Internet are HTML (hyper-text markup language) documents. HTML documents are structured because HTML tags are inserted into the document for hyper-links, formatting and layout. HTML tags are inserted before every paragraph, subheading, image, or hyper-link. Thus HTML documents are divided into sections by the HTML tags.

The inventors have realized that each section in an HTML document can be separately checksummed and CRC's for each section can be archived instead of one CRC for the entire document. Users can select sections and just these sections can be compared for changes. Thus change-detection can have a finer granularity, allowing minor changes in less relevant portions of a document to be ignored.

FIG. 7 is a diagram of an HTML document and a table of checksums for the HTML-delineated sections. HTML tags such as <tag1> begin and end each block or section of text. Typically each paragraph or heading begins and ends with an HTML tag. These HTML tags naturally define sections of the document.

Each of the sections defined by HTML tags can be separately checksummed. FIG. 7 shows a table constructed from the CRC's for each section. CRC1 is the checksum for the text in section 1, while CRC3 is the checksum for the text in section 3.

HTML Tags Skipped for Checksum

Ideally, the checksum is generated on the text between the HTML tags, and not on the HTML tags themselves. Since the HTML tags also define formatting, formatting changes can be filtered out by not including HTML tags in the checksum calculation. Thus minor changes due to formatting can be filtered out by skipping HTML tags when generating checksums.

Figure 8:
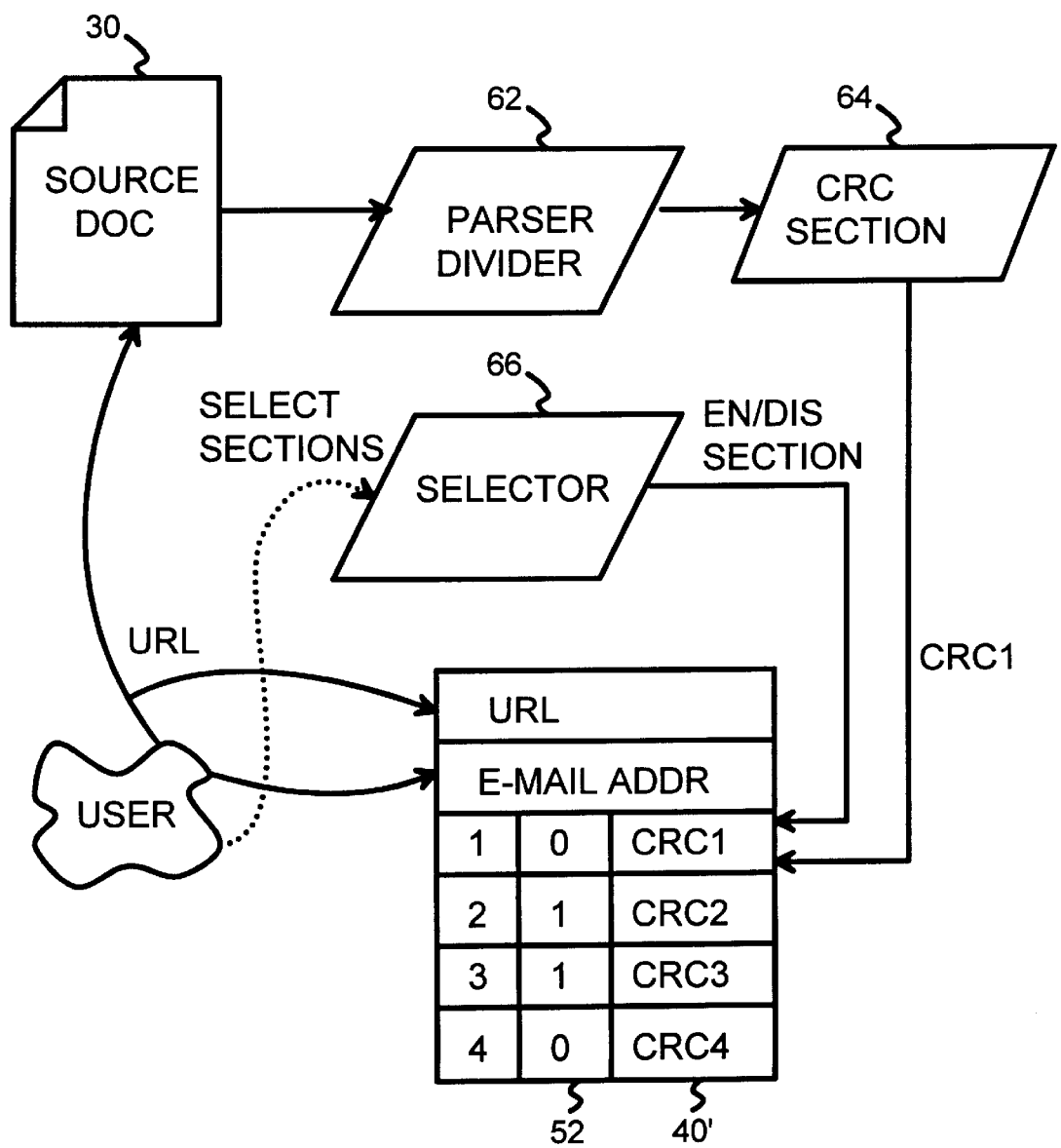
FIG. 8 illustrates the operation of responder 24 of FIG. 1 when the registered document is an HTML file.

FIG. 8 illustrates the operation of responder 24 of FIG. 1 when the registered document is an HTML file. The user initiates registration of a document by providing the URL identifying the document and the user's e-mail address. These can be provided by typing or pasting them into fields on a registration web page at change-detection server 20.

Change-detection server 20 uses the URL to fetch a copy of source document 30 from document server 12 of FIG. 1. Source document 30 could be any one of millions of HTML documents on the thousands of web servers connected to the Internet. Source document 30 is displayed to the user, allowing the user to select portions of source document 30 for registration.

Parser 62 reads characters from source document 30 and divides document 30 into sections. When parser 62 detects an HTML tag, a new section is begun with the next standard character. Thus Parser 62 divides source document 30 into sections defined by the HTML tags. Text in each of these sections is sent to CRC generator 64 which generates the checksum for that section. The checksum for each section is then stored in record 40'.

The user can select portions of source document 30 by dragging a highlight with a mouse over the text to be selected. Alternately, the user can select whole paragraphs by triple-clicking anywhere inside these sections, or double-clicking on a single word. The text could also be selected using cut-and-paste, or drag-and-drop. Changes which occur in unselected portions of source document 30 do not generate change notifications.

Selector 66 receives indications of where the user selected text in the document by mouse coordinates encoded in packets sent from the user's client. Selector 66 maps these mouse coordinates onto the HTML document to determine which sections were highlighted or selected by the user. Sections that were selected are enabled by setting a section enable bit 52 in record 40'. In this embodiment the entire section is enabled even when the user selects only a portion of the section between HTML tags. This results in a slightly larger area being selected that what the user desired, but since HTML tags separate all paragraphs, the additional portion of the section is relatively small, being no more than a paragraph in size. Record 40' shows sections 2 and 3 being enabled by the user's selection while sections 1 and 4 are ignored for change detection.

Figure 9:
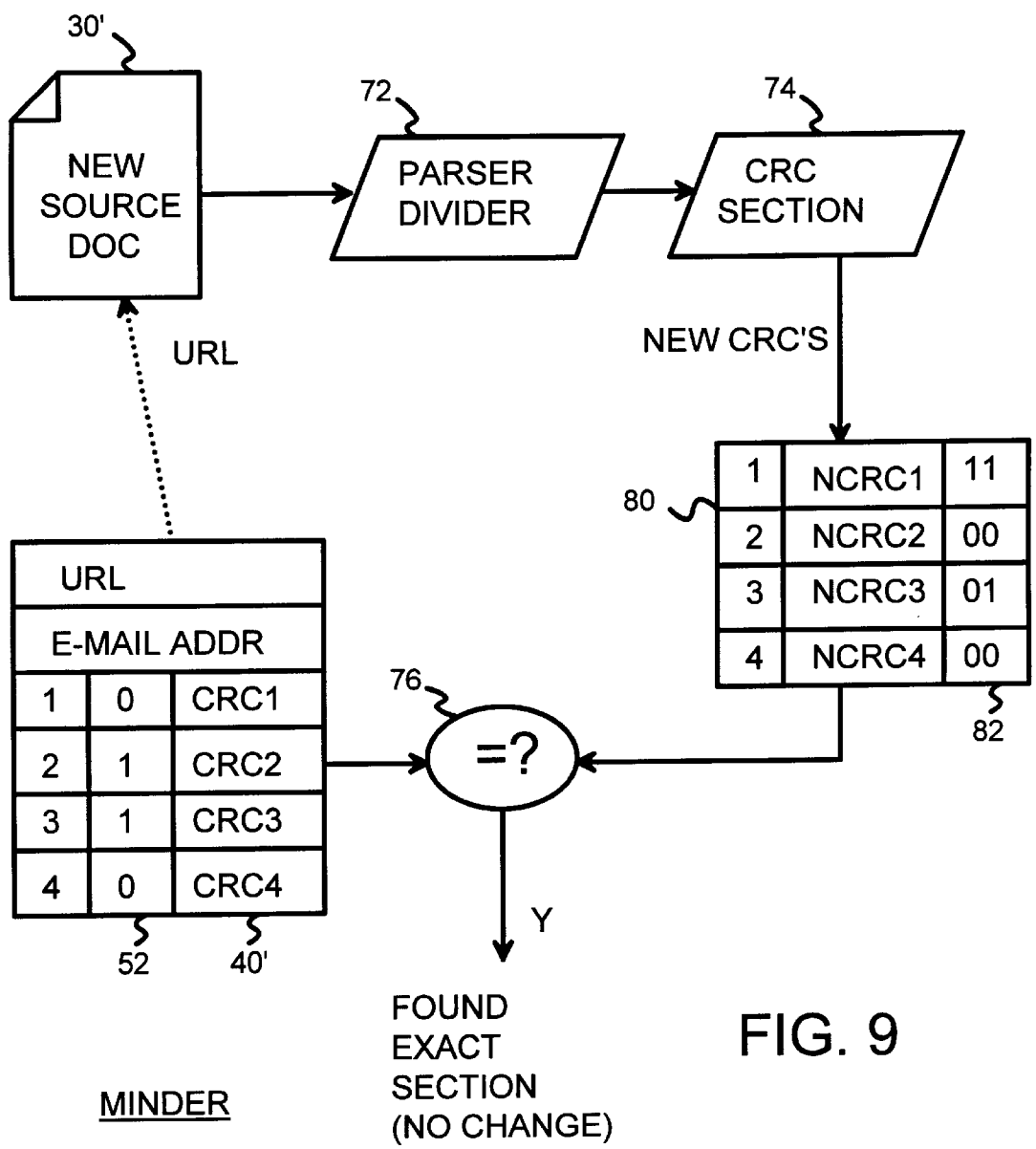
FIG. 9 illustrates the operation of minder 22 of FIG. 1 when an HTML document is checked for recent changes.

FIG. 9 illustrates the operation of minder 22 of FIG. 1 when an HTML document is checked for recent changes. When record 40' is to be checked, the URL is used to fetch a fresh copy of the source document, fresh document copy 30'. Parser 72 parses copy 30' for HTML tags, and divides copy 30' into another section when an HTML tag is found. Each section is sent to CRC generator 74, and a CRC for each section of fresh document copy 30' is generated and stored in temporary table 80.

Once all sections of document copy 30' have been checksummed, the archived checksums in record 40' are compared to the fresh checksums in temporary table 80. Comparator 76 compares each enabled CRC in record 40' to all CRC's stored in temporary table 80. If a match is found, then the section has not changed. However, if no match is found, then the section has changed.

Comparing each archived CRC to all new CRC's in temporary table 80 allows section to be re-ordered without a change being signaled. This filters out minor changes caused by re-ordering or changing the layout of a web page. A change is only signaled when the content of a selected section is changed.

Change column 82 is added to temporary table 80 to keep track of the type of changes found. A change code is written in column 82 for each section when a match is found or not found. When a match is found, the change code in column 82 is set to 00, indicating than no change occurred in this section. After all archived sections in record 40' have been compared, when all change codes in column 82 are 00, then no new sections or changed were found. However, sections with change codes other than 00 indicate a change.

The change codes are initialized to 11 before processing. Any sections whose change codes remain 11 at the end of processing are new sections, and the user can be notified and these new sections highlighted in a copy of the new document sent to the user. Any enabled archived sections which have no matching CRC's in table 80 also cause a change notification to be sent, although the location of the change cannot be determined since the original document was not stored. When sections are deleted altogether, a copy of the deleted section cannot be recovered from the archived CRC.

Structured and Unstructured Sections—FIG. 10

FIG. 10 is a diagram illustrating an alternate embodiment which archives separate checksums for HTML-defined sections and checksums for user-defined sections. The concepts of the embodiments for both structured and arbitrary documents can be combined. HTML tags can be used to define sections which have separate checksums generated, while the user can define an arbitrary selection with its own checksum.

FIG. 10 shows an HTML document where the user selects part of the text from two different sections. The user selects the last portion of the text in section 2 and the first part of the text in section 3. Two CRC tables are generated for each registered document to allow change detection for the structured HTML sections and for arbitrary user-selected sections.

Structured-section table 90 contains a row for each section defined by the parser when an HTML tag is encountered. A CRC checksum is generated for each section. The user can optionally select which entire sections are enabled or disabled, or the section enable bits can be deleted from table 90.

Unstructured-section table 92 contains entries for sections that are defined by the user selecting text blocks on the source document. For each user selection, a selection number is assigned for tracking purposes. The structured section number or identifier is also stored to identify which of the structured sections of table 90 contains the beginning of the user's selection. The length in characters of bytes of the user's selection is also stored, and the CRC generated for the user's selection.

A separate pass through the parser and CRC generator is required for each user selection in table 92. The structured sections are first determined and checksummed, building table 90. Then the user-defined sections are parsed and their checksums generated and stored in table 92. The minder checks CRC's for both the structured sections of table 90 and the user-defined sections in table 92 in an analogous manner. The user can also skip defining selections when the whole document is relevant or the user is busy or inexperienced.

This embodiment has the advantages of having structured sections while still supporting user-defined sections. The computational work to generate and check the user-defined sections is reduced since the starting point is indicated by the structured section number in table 92. When the change-detection web server is unable to locate the starting section, an earlier section can be searched for the user section by generating CRC's for all strings of the defined length with starting points in the earlier section. More complex routines can also be used when documents have changed to locate the user-defined section. The new CRC's are written back to the database, and the user's registration may need to be changed to expand or delete a user-defined section which has changed.

Storing the CRC's for the structured sections improves change detection, since the section with the mismatching CRC's can be more easily isolated. When the mis-matching section is in a disabled portion of the source document, the change can be ignored. Mismatches in enabled sections or in the user-defined section are reported to the user. When the user-defined section has a CRC mismatch, the structured CRC's for sections within the user-defined section can be compared to localize the change within the user-defined section. Thus having two CRC tables allows the change to be localized when the user-defined section spans many structured sections.

Degree of Change Reported

The inventors have realized that having separate CRC's for sections of the document provides a way to generate change statistics. Instead of merely reporting that the was a change, the change notification can include statistics about the changes. For example, when two CRC's mismatch in a document with ten sections, then $2/10$, or 20% of the document has changed. When all of the sections mismatch, then the entire document has changed. When only one section out of 20 sections change, no more than 5% of the document changed.

The percentage of the sections changed can be reported to the user with the change notification. This percent changed can be included in the subject field of the e-mail, allowing the user to discard small changes, but quickly find documents with major changes. A subject line might read "Change detected in yourfile.html: <10% changed" instantly telling the user that the change is less relevant than a message subject reading "Major Change detected in myfile.html: <70% changed".

The change-detection web server can change the subject based on the percentage of sections changed. When more than 50% of the sections change, the subject "Major Change Detected" is reported, while "Minor change detected" is reported when less than 10% of the sections change. Thus the user can be quickly alerted or more relevant changes.

The change-detection software can also have a minimum threshold of changes to generate a report. The user can set preferences so that changes affecting less than 10% of the document are not reported at all. Thus minor changes can be filtered out. When a user registers many web-page documents, a combined report could be generated which ranks the changed pages based on the percentage of sections with mismatching CRC's. Users do not have to select text in the document for this feature to be useful.

Advantages of the Invention

The change-detection tool described herein can determine not just that a change has occurred in a document: the structure of the changes to a document can be determined by localizing which parts of the document have been changed. These changed portions can be highlighted in the document and attached to the e-mailed change notice. Unchanged or unselected portions of the document can be deleted from report. The original document does not have to be stored; only CRC's from the document are archived.

Archiving CRC's of a document rather than the document itself vastly reduced storage requirements. For example, if 500,000 documents were registered, and each document averages 50 Kbytes, then 25 GigaBytes of storage are needed to store copies of the registered documents. Using the invention and storing an 8-byte CRC for each of ten sections per document requires only 40 megabytes, a reduction of storage by a factor of 600.

The invention reduces the time and effort required by a user wanting to keep abreast of changes at a web site. The user can specify the relevant portion of a web page, discarding corporate logo's, advertisements, headers and footers, and links to other web pages to focus on only textual information of interest. Since many web pages no feature flashy advertising graphics that are frequently changed and even rotated among several different ads or advertisers, the invention can be used to filter out these annoying changes. On the other hand, users who are themselves advertisers may only be interested in the advertising, and not the other content at the site ! The invention allows the user to select the portions of a web page that are relevant to that user.

The invention can determine the general location of the change although not the exact change by dividing the document or web page into smaller sections which are individually compared. Thus a section of a document can be highlighted, reducing the effort required by the user to review the changes.

The invention can automatically rank the change detected by indicating to the user how many sections have changed. The user can then ignore less comprehensive changes to a single section while being red-flagged to extensive changes to many sections of a document. The user may set preferences so that multiple sections must be changed before a notice is e-mailed. Thus single-section changes can be ignored at the user's option.

The invention can accumulate changes detected and combine them into a single report which is e-mailed to the user each month or other time period. The single report can list all the changes in all the register documents and even rank the changed document by the number of sections changed.

The user can optionally indicate the granularity of checking of a document by specifying user preferences for the document. Thus more critical documents can be divided into smaller sections, giving the user a better picture of how many changes have occurred. More casual users can have the documents divided into larger sections, saving storage space at the change-detection-tool web site. Power users can even be charged for using the advanced features while the general public is allowed to use the basic features free of charge. Thus power users can be charged for the additional storage required for registering fine-granularity documents while casual users can freely register documents using the coarse, storage-efficient settings.

Other web sites can include a brief message on their page that their users can be notified by e-mail when this page changes. The user selects the message and enters his or her e-mail address. The web site then sends an e-mail request to the change-detection tool at a different web site. The request contains the user's e-mail address and the URL of the web page. Thus existing web sites can be enhanced to provide update notices to users by including a brief message on the page itself. The change detection is handled in the normal way by the change-detection-tool's web site.

Webmasters may use the invention to keep track of linked pages. Many web pages contain hyper links to other web pages which often appear as underlined text. When the user clicks on hyper text, the URL of the hyper text is used to retrieve the referenced web page. Since the linked URL's may change, the links may fail unexpectedly. The webmaster can register all of the URL's for hyper links on his web page. Thus when any of the linked pages change, the webmaster is notified. Complete failures of these links are also detected by the change-detection tool. Thus webmasters can avoid the embarrassment of failed links by registering these links and having them automatically checked.

Alternate Embodiments

Several other embodiments are contemplated by the inventors. For example the tool has been described as for use in the public Internet, but it could also be used by private organizations behind a corporate firewall on an Intranet. Confidential process or product specifications could be stored as documents on a corporate Intranet, and employees could register the spec document's URL and thus be notified of any changes, and the relevancy of these changes. An engineer might only be interested in a portion of a process specification relating to his product and could register only that relevant portion of the spec document.

The change-detection tool can be located on a server separate from the web server itself and simply be called by the site's web server. A JAVA applet can be written to be executed by the browser client. This applet performs the functions of the responder, allowing the user to input registration information such as the e-mail address and URL. The document can first be fetched by the applet to the client, allowing the user to select a portion of the document. The applet could also generate the initial checksums, and send all this information to the change-detection tool web server once the user has finished registration. The applet reduces the loading on the responder, since these functions are performed at the client rather than at the server. The final registration information can then be mailed to the server with the change-detection-tool minder.

The invention has been described as operating on Internet documents. These documents are often complex web pages containing several individual files such as for graphics, text, and motion video and sound. Sometimes these files include small programs such as cgi scripts. Standard world-wide-web pages use the hyper-text-transfer protocol (http), but other protocols can be used in the URL. Gopher and file-transfer-program (ftp) documents can also be registered using their URL's.

Search engines can also be registered as a "document". The registered URL can include the search keywords. When the minder checks the URL for changes, the search is re-executed. The results of the search are compared to earlier results as the source document. Thus the document can be the output from execution of a search or another program. The document can thus be a temporary document or report rather than a static document. Webmasters can insert special tags into their HTML documents to disable change checking for portions of their pages that are frequently updated. An example is to disable change checking for access counters which are incremented each time a visitor accesses a page.

An enhancement which reduces storage requirements is to set a minimum size for a section of an HTML document. Sections smaller than this minimum size are combined with other sections until the minimum size is accumulated. Since headings and spurious text are usually separated by HTML tags, these headings can be combined with the following paragraph of text into a single section using this method.

HTML tags for hyper-text links also can be combined with the surrounding paragraph by requiring a minimum size of an archived section. This enhancement reduces storage requirements since CRC's and section information is only stored for larger sections and not for single-line sections such as headings and hyper-links. In some embodiments, CRC's for disabled sections which were not selected by the user can be discarded. This reduces the storage requirements. In FIG. 8, CRC1 and CRC4 and their section-enable bits could be deleted from record 40' since these sections are not selected. However, identifying the change is more difficult since the changed section is normally located by the unchanged surrounding sections.

Highlighting can be accomplished in a variety of ways. Placing characters in the left margin is a common way to highlight text. Some mail systems use color or other effects for highlighting. Premium service could check for changes more frequently than once a week or day, perhaps checking every hour or even every few minutes. A checksum can be generated by the CRC method, or by a hashing method, or by some other technique to produce a statistically unique compacted result. In addition to standard e-mail, the user can be notified immediately using a pager or personal-digital-assistant (PDA), or using a desktop push technology that continually sends updated Internet information to a user without using a standard browser or e-mail reader.

Change notification can be made for changes, documents moved to another URL, documents that can no longer be found, or re-ordered documents without other changes to the text in the sections that were re-ordered. The record for a registration can store URL's and e-mail addresses in separate databases to improve storage efficiency. The URL field in the registration is then an index into the URL database. The e-mail field is likewise an index into the e-mail or users database. Using indexes improves efficiency since an index is used to point to the longer URL's and e-mail addresses. Typically a URL is shared by several users, and an e-mail address is shared by several registrations.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A change-detection web server comprising:
    a network connection for transmitting and receiving packets from a remote client and a remote document server;
    a responder, coupled to the network connection, for communicating with the remote client, the responder registering a document for change detection by receiving from the remote client a uniform-resource-locator (URL) identifying the document, the responder fetching the document from the remote document server and generating an original checksum for a checked portion of the document, the checked portion being less than the entire document;
    archival storage means, coupled to the responder, for receiving the URL and the original checksum from the responder when the document is registered by the remote client, the archival storage means for storing a plurality of records each containing a URL and a checksum for a registered document;
    a periodic fetcher, coupled to the archival storage means and the network connection, for periodically re-fetching the document from the remote document server by transmitting the URL from the archival storage means to the network connection, the periodic fetcher receiving a fresh copy of the document from the remote document server,
    a checksum generator, coupled to receive the fresh copy of the document from the periodic fetcher, for generating a fresh checksum of a portion of the fresh copy of the document and comparing the fresh checksum to the original checksum, the checksum generator signaling a detected change to the remote client when the fresh checksum does not match the original checksum,
whereby a change in the document is detected by comparing a checksum for the checked portion of the document, wherein changes in portions of the document outside the checked portion are not signaled to the remote client.

2. The change-detection web server of claim 1 wherein the archival storage means does not store the document, the archival storage means storing a checksum for the document,
whereby storage requirements for the archival storage means are reduced by archiving checksums and not entire documents.

3. The change-detection web server of claim 2 further comprising:
    selection means, coupled to the responder, for receiving a selection from the remote client, the selection identifying boundaries of the checked portion of the document;
    parsing means, coupled to the checksum generator, for parsing the fresh copy and generating checksums for a plurality of portions of the fresh copy;
    compare means, coupled to the parsing means, for signaling a match when any of the checksums generated by the parsing means matches the original checksum from the archival storage means,
whereby a change in the document is detected when the match is not signaled by the compare means, the parsing means generating a plurality of checksums for the plurality of portions of the fresh copy.

4. The change-detection web server of claim 3 wherein the archival storage means further comprises:
    a length field for indicating a size of the checked portion, the length field written by the selection means,
    the parsing means generating each checksum for portions having the size of the checked portion,
whereby the size of the checked portion is stored and used by the parsing means.

5. The change-detection web server of claim 1 wherein the document is a hyper-text markup-language (HTML) document containing HTML tags, the HTML tags for indicating formatting, layout, and hyper-links specifying URLs of other servers, the change-detection web server further comprising:
    divider means, coupled to the responder, for dividing the document into portions bound by the HTML tags;
    checksum means for generating original checksums, an original checksum generated for each portion bound by HTML tags;
    the archival storage means storing the original checksums for the portions bound by the HTML tags;
    the checksum generator further comprising:
    second divider means for dividing the fresh copy of the document into portions bound by the HTML tags;
    second checksum means for generating fresh checksums for portions of the fresh copy bound by HTML tags in the fresh copy of the document;

compare means, receiving the fresh checksums of the fresh copy from the second checksum means, for comparing the fresh checksums to the original checksums from the archival storage means;

report means for signaling a change in the document when an original checksum for the document has no matching fresh checksum, whereby checksums are generated and stored for portions of the document bound by the HTML tags.

6. The change-detection web server of claim 5 wherein the report means further comprises:

mailer means, coupled to the network connection, for sending a change notification message to the remote client when the change is signaled, wherein the responder receives an electronic-mail address from the remote client, the responder storing the electronic-mail address of the remote client in the archival storage means, and the mailer means reading the electronic-mail address from the archival storage means, the change notification message being sent to the remote client as an electronic-mail message addressed to the electronic-mail address, whereby the remote client is notified of the change by electronic mail.

7. The change-detection web server of claim 6 further comprising:

change statistics generator, coupled to the compare means, for counting a total number of portions in the document and for determining a number of original checksums without matching fresh checksums, the change statistics generator coupled to the mailer means to include in the electronic-mail message an indication of a degree of changes in the document, wherein the degree of changes is determined for the document and included in the electronic-mail message to the remote client when a change is detected.

8. The change-detection web server of claim 7 wherein the degree of changes in the document is the number of original checksums without matching fresh checksums divided by the total number of portions in the document, whereby the degree of change reported to the remote client indicates a fraction of portions of the document which have changed.

9. The change-detection web server of claim 7 further comprising:

highlighting means, coupled to the mailer means, for attaching the fresh copy of the document to the electronic-mail message, the fresh copy having highlighting marks inserted to indicate which portions of the document have mismatching checksums, whereby the fresh copy of the document is highlighted to indicate changes to the remote client.

10. The change-detection web server of claim 9 wherein the packets transmitted to the network connection are TCP/IP packets and wherein the remote client and the remote document server are on the Internet.

11. A computer-implemented method for detecting recent changes in a document and notifying a user of the recent changes, the method comprising the steps of:

registering the document by receiving an address of the user and a locator for the document;

fetching the document from a remote server by transmitting the locator to a network server;

determining when the document is a web page with hidden tags;

when the document is a web page with hidden tags:
dividing the document into sections, each section beginning and ending with a tag, the tag not directly visible to a user viewing the document on a browser;
generating a cyclical-redundancy-checksum (CRC) for each section of the document;
storing the CRC generated for each section of the document in a database together with the locator of the document and the address of the user;

after a period of time:
reading the locator from the database and transmitting the locator to remote server to fetch a recent copy of the document;
when the document is a web page with hidden tags:
dividing the recent copy of the document into sections, each section beginning and ending with a tag;
generating a recent cyclical-redundancy-checksum (CRC) for each section of the recent copy of the document;
reading the CRC's from the database and comparing the CRC's to the recent CRC's to determine which CRC's from the database do not have a matching recent CRC;
signaling that a change is detected when a CRC's from the database does not have a matching recent CRC, whereby the document is not stored in the database which stored CRC's for tag-bound sections of web page with hidden tags.

12. The computer-implemented method of claim 11 wherein the step of signaling that a change is detected comprises:

reading the address of the user from the database and sending a message to the address of the user stating that a change has occurred, whereby the user is notified by a message when a change is detected.

13. The computer-implemented method of claim 12 wherein the step of signaling that a change is detected further comprises:

including an indication of a degree of change in the message to the user, the degree of change for the document being a function of a number of CRC's from the database that do not have a matching recent CRC, whereby the message to the user indicates the degree of change to the document.

14. The computer-implemented method of claim 13 wherein the degree of change is expressed as the number of CRC's from the database that do not have a matching recent CRC, as a percentage of a total number of CRC's for the document, whereby the percentage of change of the document is sent to the user in the message.

15. The computer-implemented method of claim 12 wherein the document is a web-page document on the world-wide web and the locator is a uniform-resource locator (URL).

16. The computer-implemented method of claim 12 wherein the period of time is about a week.

17. The computer-implemented method of claim 16 wherein the tags are not included when generating the CRC's, whereby formatting changes embedded in the tags do not signal a change, reducing occurrences of change notifications when only minor formatting changes occur to the document.

* * * * *